United States Patent [19]
Loree

[11] Patent Number: 5,899,272
[45] Date of Patent: May 4, 1999

[54] FRACTURE TREATMENT SYSTEM FOR WELLS

[75] Inventor: Dwight N. Loree, N. E. Calgary, Canada

[73] Assignee: Foremost Industries Inc., N. E. Calgary, Canada

[21] Appl. No.: 08/861,303

[22] Filed: May 21, 1997

[51] Int. Cl.$^6$ ................................................. E21B 43/26
[52] U.S. Cl. .......................................... 166/280; 166/308
[58] Field of Search .................................. 166/308, 90.1, 166/75.15, 177.5, 280

[56] References Cited

U.S. PATENT DOCUMENTS

| | | | |
|---|---|---|---|
| 3,343,602 | 9/1967 | Knox et al. | 166/42 |
| 3,602,311 | 8/1971 | Whitsitt | 166/308 |
| 3,773,438 | 11/1973 | Hall et al. | 417/345 |
| 3,848,674 | 11/1974 | McColl | 166/299 |
| 3,967,542 | 7/1976 | Hall et al. | 92/85 |
| 3,980,136 | 9/1976 | Plummer et al. | 166/280 |
| 3,981,622 | 9/1976 | Hall et al. | 417/4 G |
| 4,126,181 | 11/1978 | Black | 166/177.5 |
| 4,448,709 | 5/1984 | Bullen | 166/280 |
| 4,555,220 | 11/1985 | Hall et al. | 417/342 |
| 4,683,943 | 8/1987 | Hill et al. | 166/63 |
| 5,249,628 | 10/1993 | Surjaatmadja | 166/308 |
| 5,515,920 | 5/1996 | Luk et al. | 166/177.5 |
| 5,558,160 | 9/1996 | Tudor | 166/177.5 |
| 5,617,921 | 4/1997 | Schmidt et al. | 166/308 |

OTHER PUBLICATIONS

Abstract of U.S. Patent No. 4,779,186, Handke, et al, issued Oct. 18, 1988, 3 pages.
Abstract of U.S. Patent No. 4,538,221, Crain, et al, issued Aug. 27, 1985, 3 pages.
Abstract of U.S. Patent No. 4,353,482, Tomlinson, et al, issued Oct. 12, 1982, 3 pages.
Abstract of U.S. Patent No. 4,265,266, Kierbow, et al, issued May 5, 1981, 2 pages.
Abstract of U.S. Patent No. 4,512,405 filed Apr. 23, 1985.
Abstract of U.S. Patent No. 4,569,394 filed Feb. 11, 1986.

*Primary Examiner*—William Neuder
*Attorney, Agent, or Firm*—Davis and Bujold

[57] ABSTRACT

A well fracturing system in which a fracturing fluid storage vessel, high pressure pump and high pressure conduit are connected in series to a well. A pressure vessel is connected to the high pressure conduit for injecting proppant carrying fracturing fluid into the well without the proppant carrying fracturing fluid passing through the high pressure pump. The pressure vessel may be formed of a pipe with a free floating piston dividing the pressure vessel into a drive side and driven side. Proppant carrying fracturing fluid is stored in the driven side, and may be emplaced within the pressure vessel at a remote site from the well. Drive fluid is injected into the drive side to force the proppant carrying fracturing fluid into the high pressure conduit and down the well. The drive fluid may be a diverted portion of fracturing fluid pumped by the high pressure pumper. Several pressure vessels may be used in parallel, and proppant may be stratified in the pressure vessel.

44 Claims, 6 Drawing Sheets

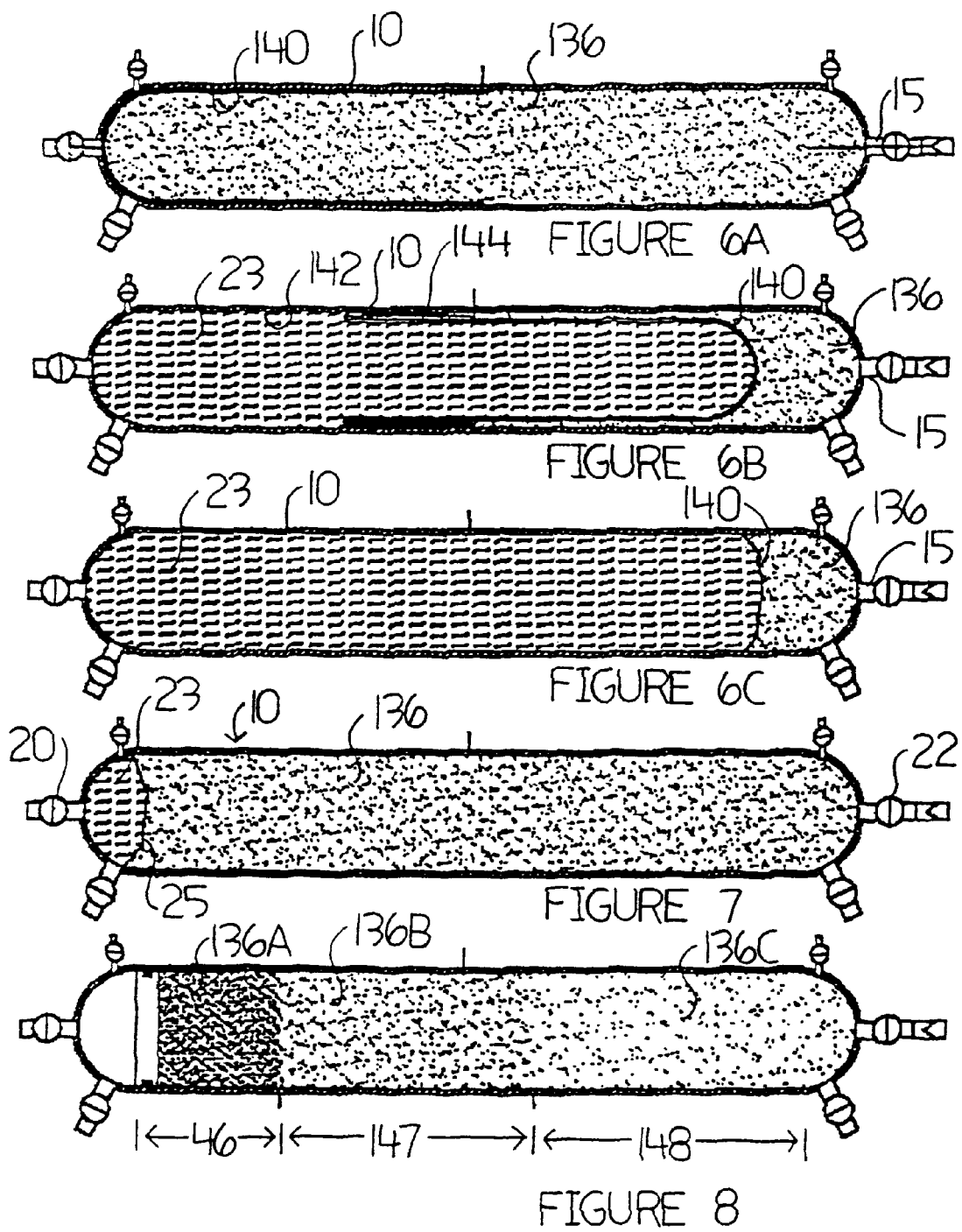

FRACTURE TREATMENT SYSTEM FOR WELLS

FIELD OF THE INVENTION

The invention relates to a method and apparatus for conducting oil and gas well fracturing (frac) operations.

BACKGROUND OF THE INVENTION

In conventional fracturing of wells, proppant and fracturing fluid are mixed in a blender and then pumped into a well. As a consequence, the blender, pump and lines carrying the fracturing fluid downstream of the blender are subject to wear from the proppant, which is frequently highly abrasive material such as sand. In addition, any flow meters or other apparatus in the lines are subject to wear and possible wash out due to the proppant. Such wear may result in failure of the equipment, or leaks that may be hazardous. The potential for wear and the possibility of fire resulting from a leak makes it necessary to inspect equipment regularly.

In addition, when proppant is mixed with fracturing fluid in a blender the proppant may clump together and it is difficult to ensure uniform mixing of the proppant in the fracturing fluid. Since fracturing operations are carried out very quickly, there is little time to rectify an error in proppant concentration, with the result that too little or too much proppant may be injected into the formation at a critical part of the fracturing operation. This may ruin the fracturing operation, or require it to be repeated, in the case that is feasible.

SUMMARY OF THE INVENTION

Objects of the invention therefore include providing a fracturing system that reduces wear on the equipment used, is safer, avoids use of blenders at the well site, with consequent reduction in expense and manpower required, and provides precise control of proppant injection into a well.

There is therefore provided in accordance with an aspect of the invention, an apparatus for fracturing a formation penetrated by a well. The apparatus comprises in series a fracturing fluid storage tank, a high pressure pump and a high pressure conduit leading from the pump to the well. In parallel with the high pressure conduit and in series with the high pressure pump and the well there is provided a pressure vessel. The pressure vessel includes dispensing means for dispensing fluid from the pressure vessel into the high pressure conduit. Flow is regulated in the high pressure conduit by a control means.

In a further aspect of the invention, the dispensing means comprises a movable piston disposed in the pressure vessel and separating the pressure vessel into a drive end and a driven end, the driven end including a vessel outlet and drive means for driving the movable piston towards the vessel outlet.

In a further aspect of the invention, the drive means comprises supply means for supplying fluid from the high pressure pumper to the drive end of the pressure vessel.

In a further aspect of the invention, the supply means comprises a diverter on the high pressure conduit for diverting a portion of flow in the high pressure conduit to the pressure vessel.

In a further aspect of the invention, the diverter has first and second outlets and fluid flow in the first and second outlets is controlled by first and second valves respectively.

In a further aspect of the invention, the supply means comprises control means for opening one of the first and second valves while closing the other of the first and second valves.

In a further aspect of the invention, the drive means comprises a high pressure pump operably connected to the drive end of the pressure vessel.

In a further aspect of the invention, the apparatus further comprises a pressure sensor sensitive to pressure in the high pressure conduit, a bypass circuit connected to the high pressure conduit and connected to return fluid from the high pressure conduit to the pump inlet, a bypass valve on the bypass circuit and a controller responsive to the pressure sensor for opening the bypass valve when the pressure in the high pressure conduit exceeds a pre-set amount.

In a further aspect of the invention, there is provided a method of preparing a proppant carrying fracturing fluid for use in fracturing wells, the method comprising the steps of mixing proppant with a fracturing fluid to form a proppant carrying fracturing fluid such that the proppant is uniformly distributed within the fracturing fluid; and storing the proppant carrying fracturing fluid in a pressure vessel.

In a further aspect of the invention, the method further comprises admixing gelation chemicals with the fracturing fluid prior to injecting the proppant carrying fracturing fluid into the pressure vessel, whereby the fracturing fluid forms a gel in the pressure vessel.

In a further aspect of the invention, there is provided a method of fracturing a formation penetrated by a well, the well being located at a well site. The method comprises the steps of creating a proppant carrying fracturing fluid at a site remote from the well site and storing the proppant carrying fracturing fluid in a pressure vessel, transporting the pressure vessel to the well site and injecting the proppant carrying fracturing fluid into the well.

In a further aspect of the invention, the pressure vessel has a drive end and a driven end, and the method further comprises the step of storing the proppant carrying fracturing fluid in the driven end of the pressure vessel.

In a further aspect of the invention, the method further comprises forming a first stream of a proppant free fracturing fluid and pressurizing the drive end of the pressure vessel to drive the proppant carrying fracturing fluid from the driven end of the pressure vessel into the first stream to form a fluid for injection into the formation at a rate and pressure to cause fracturing of the formation.

In a further aspect of the invention, the pressure vessel is pressurized with a drive fluid, such as a proppant free fracturing fluid, without mixing of the drive fluid and the second fracturing fluid.

In a further aspect of the invention, the pressure vessel is pressurized by diverting a portion of the first stream.

In a further aspect of the invention, the drive end of the pressure vessel is separated from the driven end by a movable piston, and the drive fluid acts upon the movable piston.

In a further aspect of the invention, there is provided an apparatus for storage and injection of proppant containing fracturing fluids, in which the apparatus comprises a pressure vessel having an inlet end and an outlet end, a movable fluid dividing interface, such as a free floating piston, disposed within the pressure vessel, the movable fluid dividing interface being movable from the inlet end towards the outlet end and dividing the pressure vessel into a drive side and a driven side and a port for filling the driven side of the pressure vessel. In use, the driven side of the pressure vessel is initially filled with proppant carrying fracturing fluid.

In a further aspect of the invention, there is provided a method of fracturing a formation penetrated by a well, the well being located at a wellsite, a pressure vessel being located at the wellsite, the pressure vessel having a drive end and a driven end, the method comprising the steps of forming a first stream of a first fracturing fluid; and pressurizing the drive end of the pressure vessel to drive a second fracturing fluid from the driven end of the pressure vessel into the first stream to form a fluid for injection into the formation at a rate and pressure to cause fracturing of the formation.

In a further aspect of the invention, the pressure vessel is pressurized with a drive fluid, such as the first fracturing fluid, without mixing of the drive fluid and the second fracturing fluid. The pressure vessel may be pressurized by diverting a portion of the first stream. In a further aspect of the invention, the drive end of the pressure vessel is separated from the driven end by a movable piston, and the drive fluid acts upon the movable piston.

One or more pressure vessels may be used in parallel. In addition, the invention permits use of a gas such as methane, ethane and nitrogen as a proppant free fracturing fluid used in combination with a proppant carrying fracturing fluid.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which:

FIGS. 6A, 6B and 6C are sections through pressure vessels according to the invention that use bladders to separate fluids in the pressurized vessel;

FIG. 7 is a section through a pressurized vessel according to the invention wherein a fluid interface separates drive and driven fluids in the vessel; and FIG. 8 is section through a pressurized vessel according to the invention wherein proppant of different sizes appears in different longitudinal zones within the pressure vessel.

DETAILED DESCRIPTION OF PREFERRED EMBODIMENTS

In this patent document, the term "proppant carrying fracturing fluid" means a fluid useful for the fracturing of wells in which proppant material is uniformly suspended. The fluid should have sufficiently high viscosity that the proppant does not settle during temporary storage such as may occur between filling of a pressure vessel with the fluid and use of the fluid at a wellsite, yet should still be pumpable. Typically, such a fluid will be gelled, and may be for example a gelled hydrocarbon. Techniques for gelation of fracturing fluids are well known and need not be further described here. Any conventional proppant may be used, depending on the well requirements. Also in this patent document, "high pressure" means pressures suitable for fracturing a formation penetrated by a well.

Figure 1:
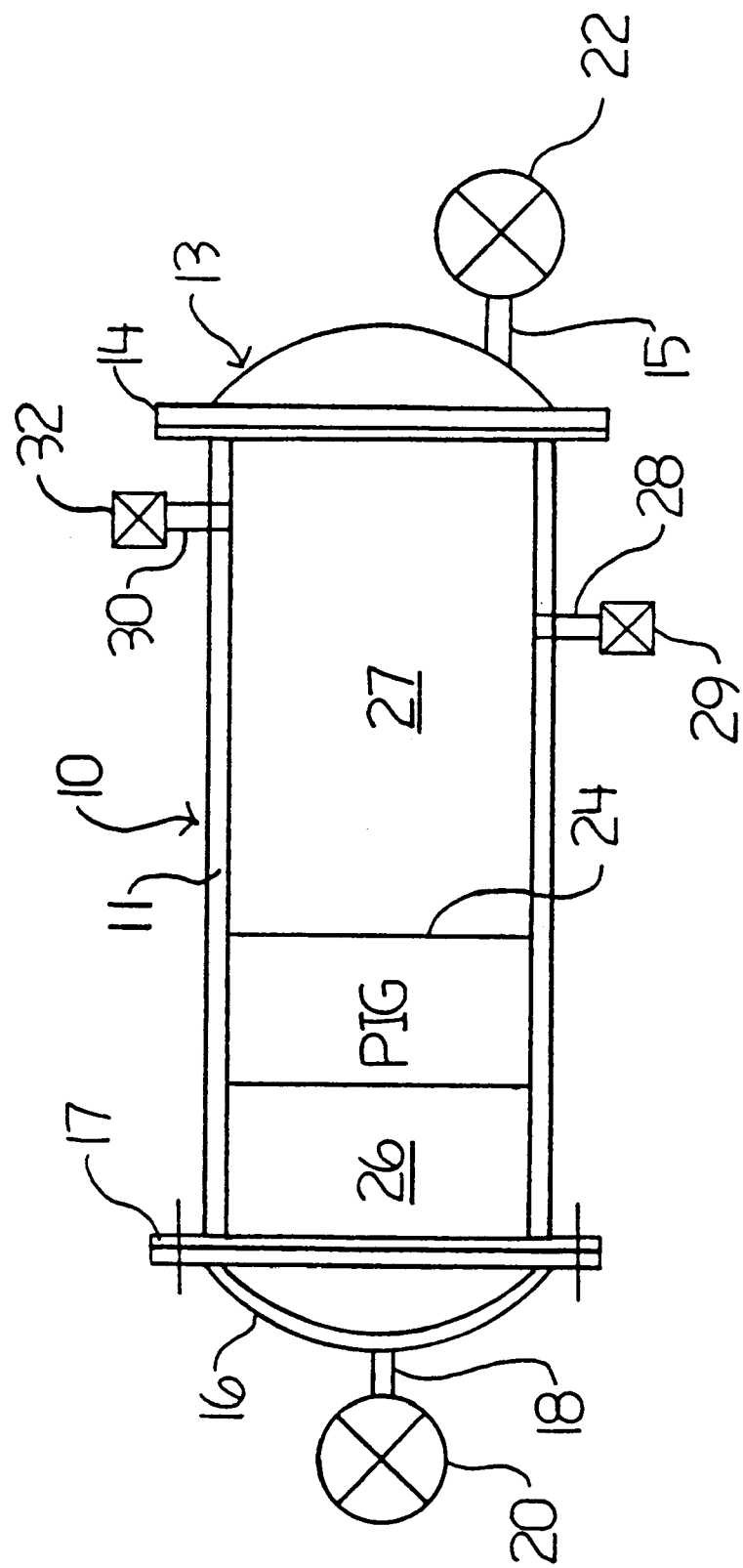
FIG. 1 is a section through a high pressure fracturing fluid storage and injection apparatus.
Figure 2:
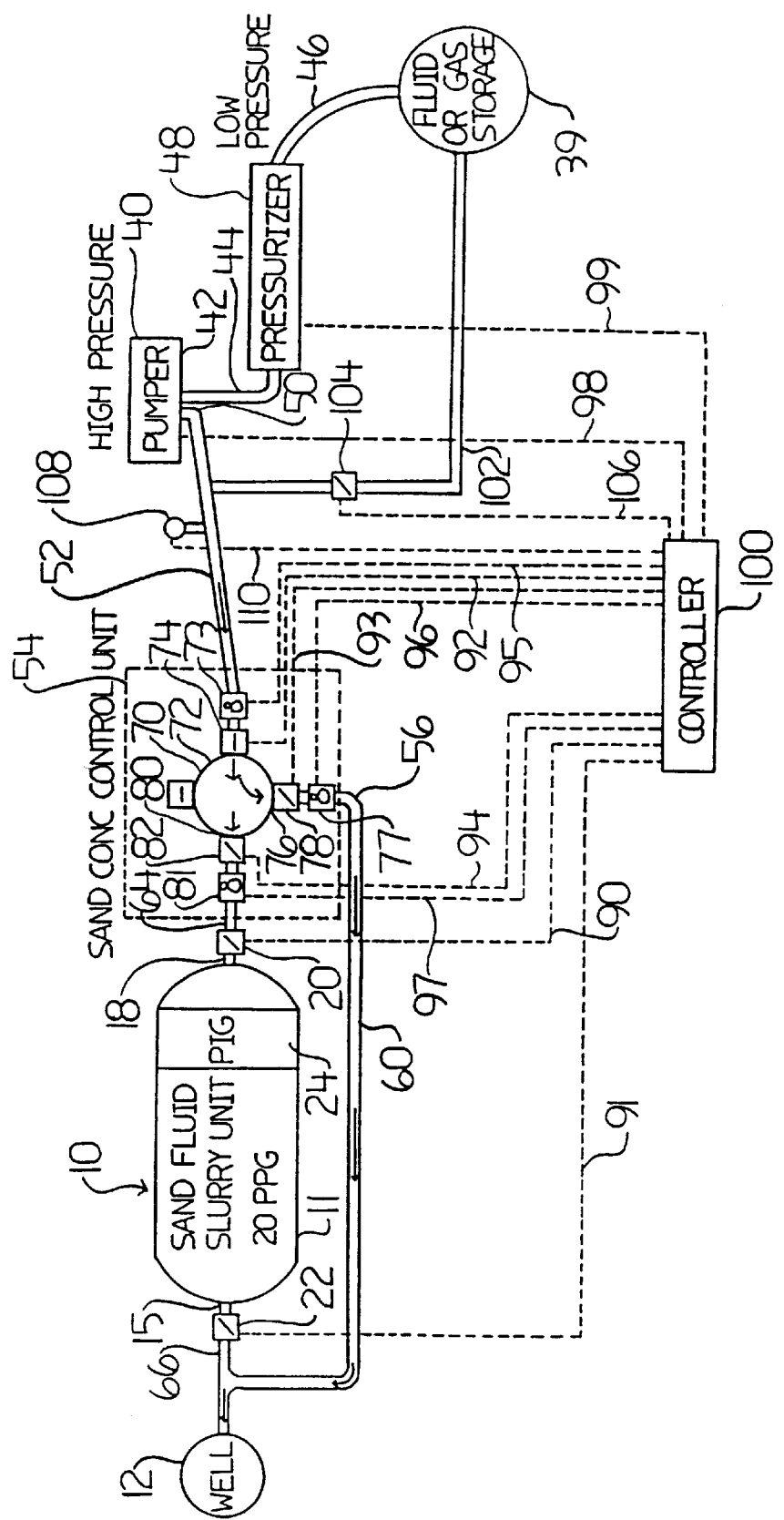
FIG. 2 is a schematic layout of apparatus according to a first embodiment of the invention at a well site for fracturing a well.
Figure 4:
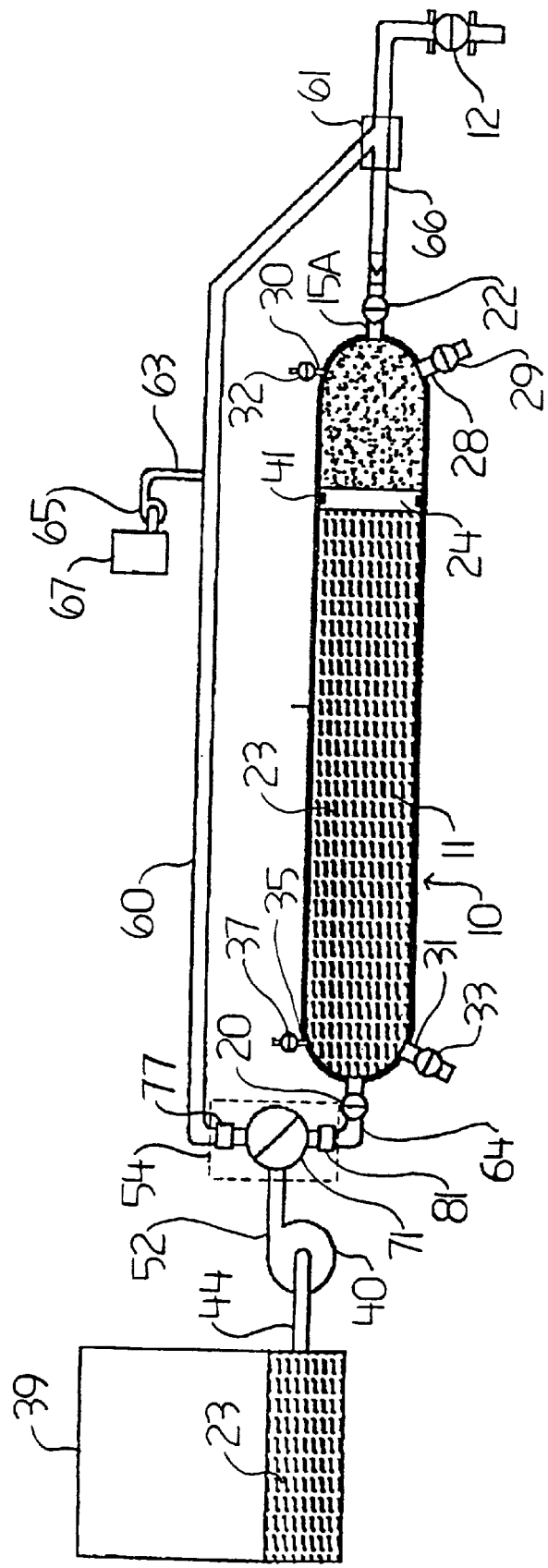
FIG. 4 is a schematic showing a section of a pressurized vessel and associated flow lines for use in accordance with the invention showing the pressurized vessel in the process of being pumped out.

Referring to FIG. 1, a pressure vessel 10 is used to store proppant carrying fracturing fluid and to inject the proppant carrying fracturing fluid into a well 12 (FIG. 2). The pressure vessel 10 is preferably made from a pipe or cylinder 11 and should have sufficient capacity to hold the fluid to be used in fracturing a well. For example, a pipe 30 inches in diameter and 45 feet long is believed suitable for many applications. Pressure tight caps 13, 16 are secured to the pipe 11 for example by flanges 14, 17 respectively to form a pressure vessel. An inlet 18 is provided in cap 16 and is controlled with a valve 20. An off axis outlet 15 is provided at cap 13 and is controlled with a valve 22. The outlet 15 may be located at a lower side of the pressure vessel 10 for ease of draining the vessel. A pig or movable plug 24 with seals 41 (FIG. 4) functioning as a free piston separates the interior of the cylinder into isolated drive and driven sides 26 and 27 respectively. A drain port 28 and associated valve 29 are provided in a lower portion of the pressure vessel 10, and a filling port 30 with control valve 32 are also provided. The drain port 28 may be located so that the pig 24 may be placed on either side of the drain port 28, or a drive side drain 31 (FIG. 4) may be used. The filling port 30 is preferably placed close to the cap 13 so that no matter where the pig 24 is located, the driven side 27 of the pressure vessel 10 may be filled with fluid. The pressure vessel 10 is also provided with conventional skids or other suitable supporting structure (not shown). As shown in FIG. 4, the pressure vessel 10 also desirably includes a drive side drain 31 and drain valve 33 at a lower portion of the drive end of the pressure vessel 10, as well as a drive side filling port 35 and drive side filling valve 37 at an upper portion of the drive side.

Referring now to FIG. 2, at the well site, a high pressure pumper 40 of conventional construction has a pump inlet 42 connected via lines 44 and 46 to a fracturing fluid storage tank 39. Line 46 is a low pressure line and a conventional pressurizer 48 is located between lines 44 and 46 to supply pressurized fluid along line 45 to the high pressure pumper 40. The high pressure pumper 40 has a pump outlet 50 connected via line 52 to a proppant concentration control unit 54, having a first outlet 56 and a second outlet at line 64. Outlet 56 is connected via line 60 to well 12. Outlet line 64 is connected to the pressure vessel inlet 18. The pressure vessel outlet 15 is connected via line 66 to line 60. Together, lines 52 and 60 and the unit 54 form a conduit leading from the high pressure pumper to the well 12.

The proppant concentration control unit 54 comprises a flow diverter 70 with an inlet port 72 controlled by valve 74, a first outlet port 76 controlled by valve 78 and a second outlet port 80 controlled by valve 82. The valves 74, 78 and 82 may each be conventional remotely controlled metering valves. A flow meter 73 is provided on line 52 for measuring flow in line 52. A flow meter 77 is provided on line 56 for measuring flow through the outlet 76 along line 60. A flow meter 81 is provided on line 64 for measuring flow through the outlet 80 along line 64. The flow meters 73, 77 and 81 are each conventional flow meters. Valves 20, 22, 74, 78 and 82 are respectively connected via lines 90, 91, 92, 93 and 94 to a conventional controller 100 that is programmed to control the valves in accordance with the frac program described in this patent document. Signals representing flow rates in lines 52, 56 and 64 respectively are provided by flow meters 73, 77 and 81 respectively along lines 95, 96 and 97 to the controller 100. Pumper 40 is connected to controller 100 via control line 98 and pressurizer 48 is connected to controller 100 via line 99. A bypass line 102 is connected between line 52 and storage tank 39. Flow in line 102 is controlled by valve 104 which receives control signals from controller 100 along line 106. A pressure sensor 108 on line 52 is sensitive to pressure in the line and is connected via line 110 to supply signals representative of the line pressure to controller 100. In FIG. 4, the sand concentration control unit 54 comprises a conventional proportioning valve 71, with flow meters 77 and 81 on lines 60 and 64 respectively.

In a preferred manner of operation of the invention, the pressure vessel 10 is first charged with proppant carrying fracturing fluid at a location remote from the well site. The proppant is mixed with a fracturing fluid in conventional manner to create the proppant carrying fracturing fluid either in the driven side 27 of the pressure vessel 10 or in another vessel and then transferred to the driven side 27 of the pressure vessel 10. The fluid is injected into the pressure vessel 10 through port 30. Prior mixing may be done slowly to ensure uniform distribution of the proppant in the fracturing fluid. To ensure that the proppant does not settle, the fracturing fluid should have sufficient viscosity to prevent settling during transportation and temporary storage of the proppant carrying fracturing fluid. For this purpose, conventional gelation chemicals may be mixed with the fracturing fluid so that the fracturing fluid forms a gel in the pressure vessel. The proppant carrying fracturing fluid is then stored in the pressure vessel 10 while the pressure vessel 10 is transported to a well site on a trailer. During transportation, the pressure vessel 10 may be rotated or its contents gently agitated with an internal stirring device to maintain the proppant uniformly distributed within the gelled fracturing fluid.

At the well site, the pressure vessel 10 is used to inject or dispense proppant carrying fracturing fluid into the well 12 in a controllable fashion under pressure. The proppant carrying fracturing fluid is dispensed by driving the movable piston 24 with drive fluid 23 (FIG. 4 for example) injected into the drive side 26 of the pressure vessel 10. Pressure on drive side of the piston 24 urges the piston 24 along the pipe 11 towards the driven side as shown in FIG. 4. The drive fluid may be supplied through lines 52 and 64 and driven by the pumper 40. The extent to which fracturing fluid is supplied along lines 64 and 60 is regulated by the sand concentration control unit 54.

In the initial stages of a frac operation, a pad of liquid fracturing fluid, such as condensate, is injected into the well 12 by forming a stream of fracturing fluid in lines 52 and 60. Pressure on the fracturing fluid is gradually increased to initiate fracturing of the formation penetrated by the well in accordance with well established techniques. In this initial stage, the entire output of the pumper 40 is supplied along lines 52 and 60 into the well 12. Valve 82 is closed and valve 78 is open. The pressure vessel 10 is inoperative and no proppant is carried into the well 12. As the frac progresses, it becomes necessary to add proppant in order to keep open any cracks that have been opened in the formation. In the present invention, this is accomplished by opening valve 82 while closing valve 78. The rate at which valve 82 is opened, and valve 78 correspondingly closed, depends on the proppant density distribution in the pressure vessel and the proppant density required by the frac program. Typically, in a frac program, the proppant density is low at the start of introducing proppant into the well, and then increases. Thus, the valve 82 will typically be opened gradually, according to the proppant density required by the frac program. Use of the pressure vessel 10 for injection of proppant carrying frac fluid into the well allows for precise control of proppant density. The valve 78 acts as a variable choke on the line 60, forcing fluid flow into the line 64. It may be desirable in some circumstances to use a separate variable choke on line 60 to establish a pressure differential in line 60 between the control unit 54 and junction with the line 66.

The opening of valve 82 and closing of valve 78 diverts some of the fluid from line 52 into line 64 and into the pressure vessel 10, causing an increased pressure on the drive side 26 of the pressure vessel 10. Pressure differential across the pig 24 causes the pig to move towards the driven side 27 of the pressure vessel and, without mixing of the drive fluid and driven fluid, force proppant carrying fracturing fluid out of the driven side into line 66 to mix with the proppant free stream of liquid in line 60 and thence be injected into the well 12. Mixing may take place in a mixing chamber 61 shown in FIG. 4. Chemicals may also be injected into line 60 through a line 63 by pump 65 and chemical storage unit 67 shown in FIG. 4. By control of the pressure in line 52 using pumper 40, the fluid may be injected into the formation at a rate and pressure sufficient to cause fracturing of the formation penetrated by the well. While control of the valves 78 and 82 may be accomplished manually, it is preferred to control them with controller 100. Pressure on the proppant carrying fracturing fluid may be increased during injection of the proppant carrying fracturing fluid into the well 12 as required by the frac program. To prevent fluid from the well entering the pressure vessel 10, a one-way check valve (not shown) may be installed on the line 66.

As the frac progresses, it becomes desirable to stop injecting proppant carrying fracturing fluid and flush what is in the well into the formation. Valve 82 is therefore closed while valve 78 is correspondingly opened until all flow in line 64 is shut off. The operator will know from the volume pumped when the proppant has been flushed into the formation.

Figure 3:
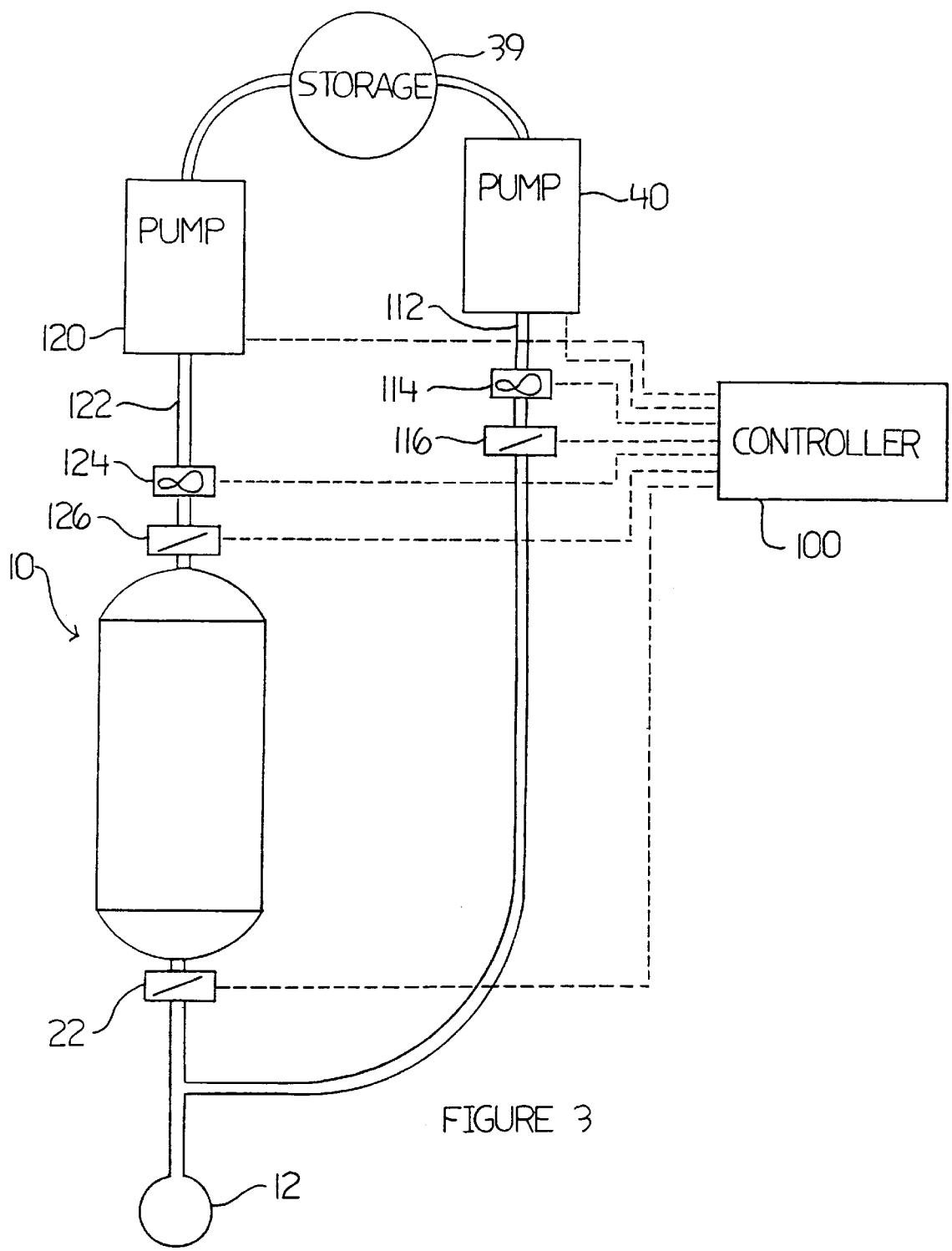
FIG. 3 is a schematic layout of apparatus according to a second embodiment of the invention at a well site for fracturing a well.

While use of the pumper 40, control unit 54 and their associated valves and lines comprises means for dispensing fluid from the pressure vessel, the pressure vessel 10 may also be driven by other means, such as shown in FIG. 3. In FIG. 3, a first high pressure pumper 40 is connected via line 112, flow meter 114 and valve 116 to the well 12. In addition, a drive means for a pressure vessel 10, constructed according to the pressure vessel shown in FIG. 1, includes a second high pressure pumper 120 connected via line 122 through flow meter 124 and valve 126 to pressure vessel 10. Valve 126 may be the same as valve 20. Both pumpers 40 and 120 and the associate lines 112, 122 and valves 116, 126 are controlled by controller 100. As in the embodiment shown in FIG. 2, during initial and late stages of a frac, valve 126 is closed and valve 116 is open. When a controlled amount of proppant carrying fracturing fluid is to be mixed with the stream of fluid in line 112, valve 126 is opened while valve 116 is closed. At the end of the frac, valve 126 is closed, while valve 116 is opened more. The drive fluid used by pumper 120 may be the same fracturing fluid used by pumper 40, or may be any other fluid capable of driving the pig 24 in pressure vessel 10.

In a further embodiment, particularly if the pressure vessel 10 has a small diameter compared with its length, the pig 24 may be omitted and the proppant carrying fracturing fluid driven solely by fluid entering the drive end 26 of the pressure vessel as shown in FIG. 7. However, some mixing of the drive fluid 23 and the proppant carrying fracturing fluid 136 is likely to occur at the interface 25 between drive fluid 23 and driven fluid 136, meaning that some of the fluid will not be usable, or only usable with care. If the mixing interface however is sufficiently small in relation to the volume of the pressure vessel, this may not be a problem in some applications where some fluid wastage is acceptable. Alternatively, the interface formed between drive fluid 23 and driven fluid 136 may be formed with a bladder 140 as shown in FIGS. 6A–6C. In FIG. 6A, the bladder 140 is in position for commencing driving of proppant carrying fracturing fluid 136 into the well 12. The bladder 140 closely follows the interior surface 142 of the drive end 26 of the pressure vessel 10. The pressure vessel 10 is completely filled with proppant carrying fracturing fluid 136. In FIG. 6B, drive fluid 23 has been forced into the drive side 26 of the pressure vessel 10, forcing the bladder 140 towards the driven side 27 of the pressure vessel 10 and forcing proppant carrying fracturing fluid 136 out of the pressure vessel 10 through outlet 15. In this intermediate stage of injection, the bladder 140 is partly folded as shown at 144. In FIG. 6C, the bladder 140 is shown completely extended. The bladder 140 is not preferred since it is prone to overlapping and folding.

The pressure vessel 10 is charged at the remote well site with a known density of proppant, for example 20 pounds per gallon. The precise rate of pumping of proppant may then be determined from the flow rates indicated by the flow meter 124. The proppant to fluid ratio in the fracturing fluid entering the well 12 may be readily controlled by varying the amount of flow permitted in lines 112 and 122.

The fracturing fluid that forms a stream in lines 52 or 112 may be any conventional fluid used for fracturing wells such as diesel, condensate, oil of various kinds, liquid hydrocarbon, and alcohols.

It is believed that the fracturing fluid may also be a gas, such as methane, ethane and nitrogen. In this case, the pumper 40 will be replaced by a conventional compressor. When the proppant free fracturing fluid is a gas, it is believed that gelled alcohol or gelled liquid hydrocarbon may be used for the proppant carrying fracturing fluid that is mixed with the stream of gas. The pressure vessel 10 may be driven by diverting gas from the compressor in this instance. The fracturing fluid may also be a liquified gas such as butane, propane and carbon dioxide, which is pumped into the well in a liquified state.

Figure 5:
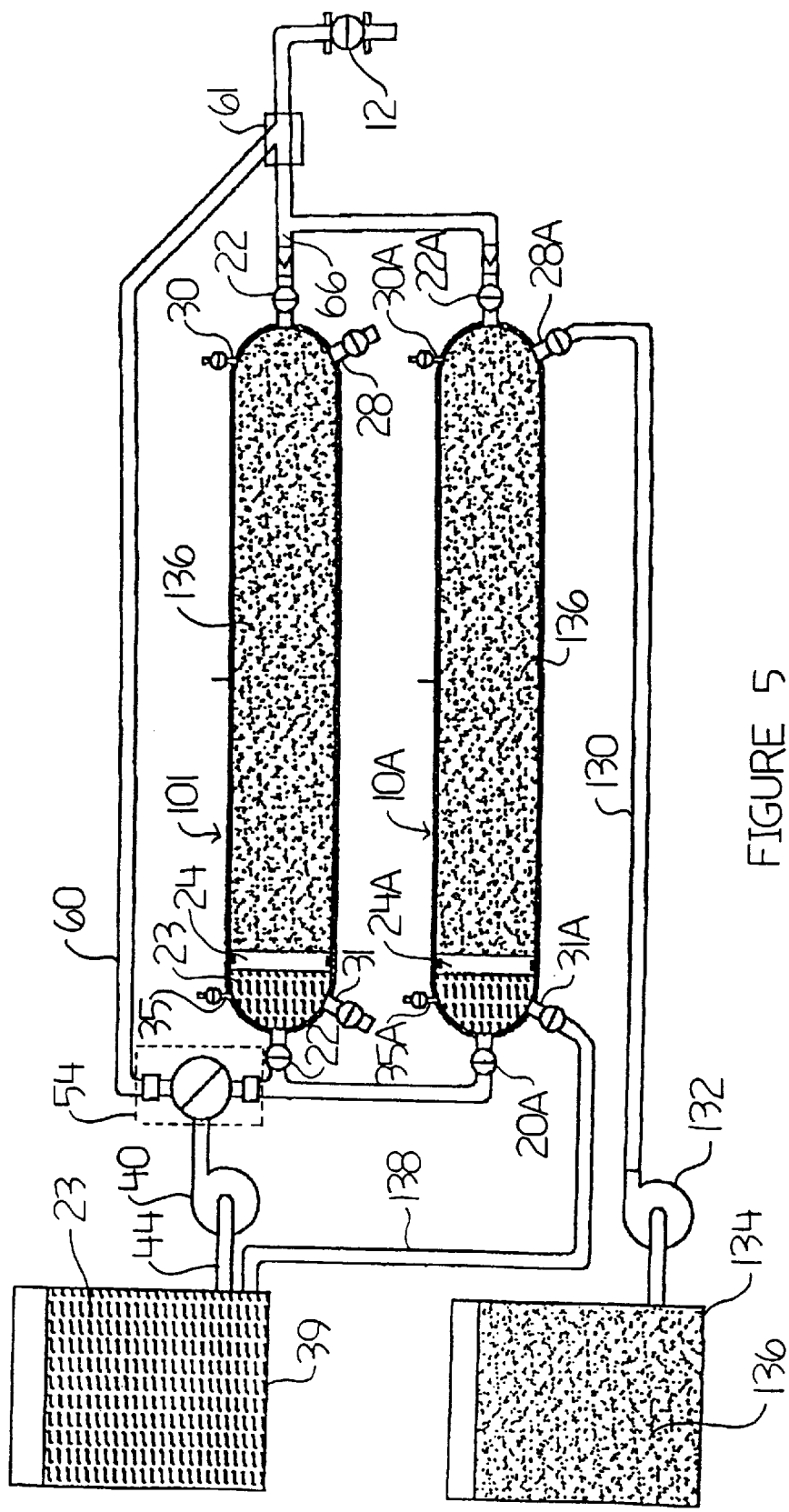
FIG. 5 is a schematic showing a section of two pressurized vessels in parallel according to the invention, with one of the vessels connected for filling at the well site.

The pumps may for example be Gardner Denver™ piston pumps or Reda™ centrifugal pumps or equivalents, which are commonly commercially available. The pressure vessel 10 may be made from aluminum, steel, titanium alloys, or other suitable material, depending on the application. Two or more pressure vessels 10, 10A may be used in parallel as shown in FIG. 5, for example to meet volume requirements. Features of the second pressure vessel 10A are the same as those of pressure vessel 10 but the reference numerals are supplied with the suffix A to allow the two pressure vessels to be distinguished in this patent document. The lines 52, 60 and 112 may use chiksan swivel joints and do not carry abrasive material. In some embodiments of the method of the invention, mixing of proppant carrying fracturing fluid may be done on site as illustrated in FIG. 5, with the pressure vessel 10 separately trucked to the site. In FIG. 5, pressure vessel 10A has its outlet 15A connected via line 66A to line 66. Driven side drain 28A is connected via line 130 to pump 132, which in turn is connected to storage unit 134. Storage unit 134 contains a proppant carrying fracturing fluid 136 which may be pumped by pump 132 into the pressure vessel 10A. Pump 132 may be a low pressure pump of conventional construction since it is not required to pressurized fluids in the well 12. The drive side drain 31A of pressure vessel 10A is connected via line 138 to fracturing fluid storage vessel 39. As the pressure vessel 10A is recharged, fracturing fluid returns to the storage vessel 39 through line 138. Upon recharging of the pressure vessel 10A, and any other pressure vessel 10 on site, a fracturing process may be continued. A large frac, requiring for example in the order of 60 m³ of proppant carrying fracturing fluid, may then be accomplished with, say, five pressure vessels, each being recharged once in sequence, with recharging of one or more continuing while another is being discharged. In addition, the pressure vessel 10 or 10a may be charged on site with the system shown in FIG. 5.

In some well fracturing programs, it is desirable to have different sizes of proppant in the proppant carrying fracturing fluid during different stages of the fracturing treatment. For this purpose, the proppant carrying fracturing fluid 136 may be stratified as shown in FIG. 8, with different sizes 136A (largest), 136B, 136C (smallest), or density of proppant in different longitudinal zones 146, 147, 148 of the pressure vessel 10. For filling the pressure vessel 10 with proppant carrying fracturing fluid with different sizes of proppant, the pressure vessel 10 is preferably charged through outlet 15 with the piston 24 initially as close to the outlet 15 as possible. The pressure vessel 10 is then charged with the reverse sequence of proppant sizes and density as to be discharged according to the frac program. Thus, a proppant carrying frac fluid with a first proppant size and density is injected into the pressure vessel 10, and the piston 24 is pushed back to accommodate this frac fluid. Then a proppant carrying fracturing fluid with a second proppant size and density is injected into the pressure vessel 10. A pressure vessel 10 to be charged in this manner should have a centrally located outlet 15A as illustrated in FIG. 4.

The pressure vessel 10 preferably has sufficient volume to complete a fracturing treatment of a well, preferably more than about 5 m³, without being too large for transportation. In this way, fracturing of a formation may be completed with only a single cycle of driving proppant carrying fracturing fluid from the pressure vessel. The vessel does not need to be recharged at the well site. However, where larger fluid volumes are required, one or more additional pressure vessels 10 may be used, again without requiring recharging of any of the pressure vessels 10. On the other hand, recharging of the pressure vessel 10 at the well site may be required in some circumstances.

In cases where settling of the proppant during transportation in the pressure vessel is a concern, the pressure vessel 10 may be provided with a system for continuous slow mixing of the proppant carrying fracturing fluid during transportation.

In this way, blenders for high rate blending of sand and frac fluid are not required. Fewer personnel are required at the well site, less expensive equipment may be used, cheaper fluids may be used such as propane as the frac fluid and the frac may be carried out more safely with less wear on the equipment.

Cycle time, being defined as the period during which proppant carrying fracturing fluid is discharged from the pressure vessel 10 without recharging, may be as low as 3½ to 4 minutes but will typically be longer. At this slow cycle rate, very little wear is experienced by the pressure vessel in discharging fluid into the well, and no wear is experienced by the pump 40, and lines 52 and 60, upstream of the conjunction of lines 60 and 66, or any of the components on the lines 52 and 60. Those items that are subject to wear, such as the tubing between the pressure vessel 10 and the well, may be made with wear resistant material such as tungsten carbide.

Very low pressure differentials, for example in the order of 150–200 psi, across the piston 24 are required to cause the piston 24 to move, although the pressure vessel itself will be pressured at the high frac pressure.

An alternative to using the pumper 40 or pump 120 as part of a means to drive fluid from the pressure vessel 10 is to use a mechanically driven piston.

A person skilled in the art could make immaterial modifications to the invention described in this patent document without departing from the essence of the invention that is intended to be covered by the scope of the claims that follow.

The embodiments of the invention in which an exclusive property or privilege is claimed are defined as follows:

1. An apparatus for fracturing a formation penetrated by a well, the apparatus comprising:
   a fracturing fluid storage tank;
   a high pressure pumper having a pump inlet operably connected to the fracturing fluid storage tank and having a pump outlet;
   a high pressure conduit leading from the pump outlet to the well;
   a pressure vessel having a vessel outlet connected by a line to the high pressure conduit;
   dispensing means for dispensing fluid from the pressure vessel into the high pressure conduit; and
   means for regulating flow in the high pressure conduit.

2. The apparatus of claim 1 in which the dispensing means comprises:
   a movable piston disposed in the pressure vessel and separating the pressure vessel into a drive end and a driven end, the driven end including the vessel outlet; and
   drive means for driving the movable piston towards the vessel outlet.

3. The apparatus of claim 2 in which the drive means comprises supply means for supplying fluid from the high pressure pumper to the drive end of the pressure vessel.

4. The apparatus of claim 3 in which the supply means comprises:
   a diverter on the high pressure conduit for diverting a portion of flow in the high pressure conduit to the pressure vessel.

5. The apparatus of claim 4 in which:
   the diverter has first and second outlets; and
   fluid flow in the first and second outlets is controlled by first and second valves respectively.

6. The apparatus of claim 5 in which the supply means comprises:
   control means for opening one of the first and second valves while closing the other of the first and second valves.

7. The apparatus of claim 1 in which the pressure vessel has sufficient volume to complete fracturing a formation without being recharged.

8. The apparatus of claim 2 in which the drive means comprises:
   a high pressure pump operably connected to the drive end of the pressure vessel.

9. The apparatus of claim 1 further comprising:
   a pressure sensor sensitive to pressure in the high pressure conduit;
   a bypass circuit connected to the high pressure conduit and connected to the fracturing fluid storage tank to return fluid from the high pressure conduit to the pump inlet;
   a bypass valve on the bypass circuit; and
   a controller responsive to the pressure sensor for opening the bypass valve when the pressure in the high pressure conduit exceeds a pre-set amount.

10. The apparatus of claim 1 in which the pressure vessel has a drive end and a driven end, the vessel outlet being at the driven end, and an inlet being at the drive end, the dispensing means comprising drive means to supply drive fluid to the drive end of the pressure vessel through the inlet.

11. The apparatus of claim 10 in which the drive means comprises a second high pressure pumper connected to supply fluid to the drive end of the pressure vessel.

12. The apparatus of claim 11 in which the dispensing means comprises a movable piston disposed in the pressure vessel and separating the drive end from the driven end.

13. The apparatus of claim 1 further comprising:
   a second pressure vessel having an outlet connected to the high pressure conduit; and
   second drive means for driving fluid from the pressure vessel into the high pressure conduit.

14. A method of preparing a proppant carrying fracturing fluid for use in fracturing wells, the method comprising the steps of:
   admixing gelation chemicals with a fracturing fluid:
   mixing proppant with the fracturing fluid to form a proppant carrying fracturing fluid such that the proppant is uniformly distributed within the fracturing fluid; and
   storing the proppant carrying fracturing fluid in a pressure vessel whereby the fracturing fluid forms a gel in the pressure vessel.

15. A method of fracturing a formation penetrated by a well, the well being located at a well site, the method comprising the steps of:
   creating a proppant carrying fracturing fluid at a site remote from the well site;
   storing the proppant carrying fracturing fluid in a pressure vessel;
   transporting the pressure vessel to the well site; and
   injecting the proppant carrying fracturing fluid into the well.

16. The method of claim 15 in which fracturing the formation is completed without recharging the pressure vessel.

17. The method of claim 15 in which the pressure vessel has a drive end and a driven end, and in which the proppant carrying fracturing fluid is stored in the driven end of the pressure vessel.

18. The method of claim 17 further comprising:
   forming a first stream of a proppant free fracturing fluid; and
   driving the proppant carrying fracturing fluid from the driven end of the pressure vessel into the first stream to form a fluid for injection into the formation at a rate and pressure to cause fracturing of the formation.

19. The method of claim 18 in which driving the proppant carrying fracturing fluid comprises pressurizing the drive end of the pressure vessel.

20. The method of claim 19 in which the pressure vessel is pressurized with a drive fluid without mixing of the drive fluid and the second fracturing fluid.

21. The method of claim 20 in which the drive fluid is the proppant free fracturing fluid.

22. The method of claim 21 in which the pressure vessel is pressurized by diverting a portion of the first stream.

23. The method of claim 22 in which the drive end of the pressure vessel is separated from the driven end by a movable piston, and the drive fluid acts upon the movable piston.

24. The method of claim 18 in which the first stream comprises a mixture of one or more gases.

25. The method of claim 24 in which the mixture of one or more gases is selected from the group consisting of methane, ethane and nitrogen.

26. Apparatus for storage and injection of proppant containing fracturing fluids, the apparatus comprising:

a pressure vessel having an inlet end and an outlet end;

a movable fluid dividing interface disposed within the pressure vessel, the movable fluid dividing interface being movable from the inlet end towards the outlet end and dividing the pressure vessel into a drive side and a driven side; and a port for filling the driven side of the pressure vessel.

27. The apparatus of claim 26 in which the pressure vessel is cylindrical.

28. The apparatus of claim 27 in which the movable fluid dividing interface is a free floating piston.

29. The apparatus of claim 28 in which the outlet end comprises an off axis outlet.

30. The apparatus of claim 26 in which the driven side of the pressure vessel is filled with proppant carrying fracturing fluid.

31. The apparatus of claim 26 in which the pressure vessel further includes a driven side drain valve for draining the driven side of the pressure vessel.

32. The apparatus of claim 26 in which the pressure vessel further includes a drive side drain valve for draining the drive side of the pressure vessel.

33. The apparatus of claim 26 in which the pressure vessel has sufficient volume to hold fluid for a single well fracturing operation.

34. The apparatus of claim 26 in which the pressure vessel has a volume in excess of 5 cubic meters.

35. A method of fracturing a formation penetrated by a well, the well being located at a wellsite, a pressure vessel being located at the wellsite, the pressure vessel having a drive end and a driven end, the method comprising the steps of:

forming a first stream of a first fracturing fluid; and driving a second fracturing fluid from the driven end of the pressure vessel into the first stream to form a fluid for injection into the formation at a rate and pressure to cause fracturing of the formation.

36. The method of claim 35 wherein the second fracturing fluid has proppant distributed within the second fracturing fluid.

37. The method of claim 36 in which driving the second fracturing fluid comprises pressurizing the drive end of the pressure vessel.

38. The method of claim 37 in which the pressure vessel is pressurized with a drive fluid without mixing of the drive fluid and the second fracturing fluid.

39. The method of claim 38 in which the drive fluid is the first fracturing fluid.

40. The method of claim 39 in which the pressure vessel is pressurized by diverting a portion of the first stream.

41. The method of claim 40 in which the drive end of the pressure vessel is separated from the driven end by a movable piston, and the drive fluid acts upon the movable piston.

42. The method of claim 35 in which the fracturing of the well is completed by a single cycle of driving fluid from the pressure vessel without recharging the pressure vessel.

43. The method of claim 35 in which the first stream comprises a mixture of one or more gases.

44. The method of claim 43 in which the mixture of one or more gases is selected from the group consisting of methane, ethane and nitrogen.

* * * * *